Sept. 20, 1971     A. E. NUPNAU     3,606,121

MOTION PICTURE PROJECTOR SHUTTLE

Filed Dec. 31, 1969

Inventor:
Arthur E. Nupnau.

By Finnegan, Henderson & Farabow
Atty

United States Patent Office 3,606,121
Patented Sept. 20, 1971

3,606,121
MOTION PICTURE PROJECTOR SHUTTLE
Arthur E. Nupnau, Chicago, Ill., assignor to
Bell & Howell Company, Chicago, Ill.
Filed Dec. 31, 1969, Ser. No. 889,535
Int. Cl. G03b *1/22*
U.S. Cl. 226—62                                  7 Claims

ABSTRACT OF THE DISCLOSURE

An improved intermittent film moving mechanism for use in motion picture apparatus is provided. The mechanism includes a pulldown cam disposed within an intermediately located central opening of a shuttle having two cam engaging surfaces and film engaging members. A slot, having opposed sides, is formed within the shuttle and extends into the central opening of the shuttle, and a screw is positioned across the slot and secured to the shuttle adjacent the opposing sides of the slot for opening and closing the slot and thus changing the configuration of the shuttle and the position of the cam engaging surfaces relative to the cam.

Figure 1:
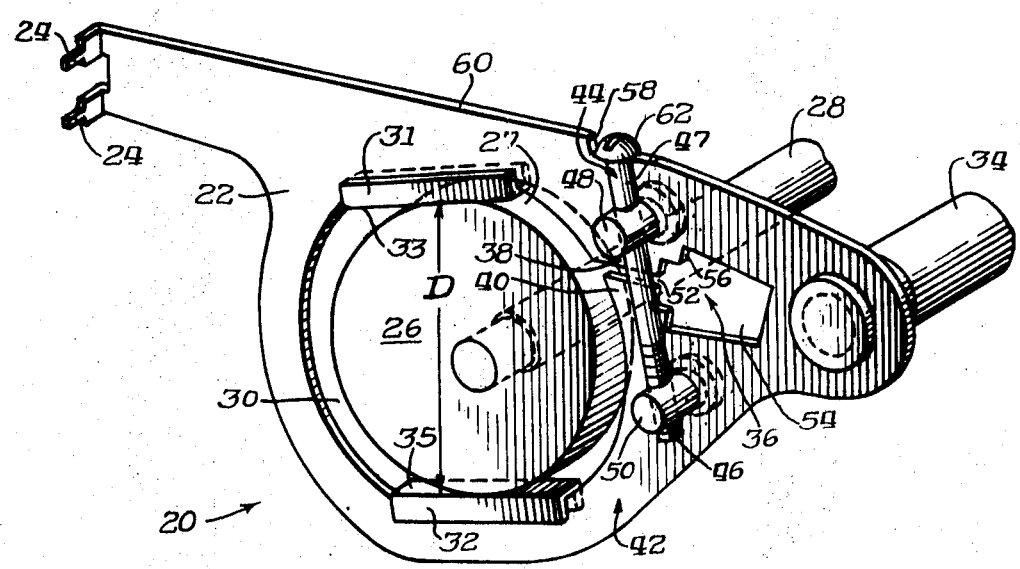

This invention relates to intermittent film moving mechanisms for use in motion picture apparatus, such as projectors, and particularly relates to means for accurately controlling the relative position of cam engaging surfaces of a shuttle with a pulldown cam.

Various types of intermittent film moving devices similar in some respects to that of the present invention have been proposed or utilized in the past. These devices, however, have not been altogether satisfactory for the reason that they are constructed by techniques which are unable to produce exact duplicates of each part used in the mechanism. In order to achieve a very close fit between the cam engaging surfaces of a pulldown cam, such as the cam engaging surfaces on the nylon cam shoes that are ordinarily used in the intermittent mechanisms of this type, and the pulldown cam itself, it is necessary to resort to selective assembly and 100 percent inspection of the parts to grade the variations in the parts. This procedure is costly and time consuming.

Accordingly, this invention provides an improved intermittent film moving mechanism fabricated from parts which are inexpensively manufactured and easily assembled in cooperative relationship without the need to resort to selective assembly and/or 100 percent inspection of the parts to grade variations in part size.

This invention also provides an intermittent film moving mechanism which can be adjusted to compensate for any variations in the sizes of the manufactured parts.

Additional advantages of the invention will be set forth in part in the description which follows, and in part will be obvious from the description, or may be learned by practice of the invention. The advantages of the invention are realized and attained by means of the instrumentalities and combinations particularly pointed out in the appended claims.

In accordance with its purpose, as embodied and broadly described, the intermittent film moving mechanism of this invention includes a shuttle having an intermediately located central opening and two cam engaging surfaces, a film engaging member attached to the shuttle, a rotatable cam engaged with the shuttle through the two cam engaging surfaces for reciprocating the shuttle and its attached film engaging member up and down relative to the film, drive means for rotating the cam, and adaptation means mounted on the shuttle to accurately adjust the position of the cam engaging surfaces. The adaptation means include a slot, having opposed sides, formed within the shuttle and extending into the central opening, and an adjustment means positioned across the slot and secured to the shuttle adjacent the opposing sides of the slot for opening and closing the slot and thus changing the configuration of the shuttle and the position of the cam engaging surfaces with respect to the cam.

Preferably, the shuttle is pivoted at one end, the film engaging member is attached to the other end, and the cam is disposed within the intermediately located central opening of the shuttle to control movement of the shuttle arcuately of its pivot. It is also preferred that the two (2) cam engaging surfaces are opposite each other and engage the cam at opposite peripheral sides of the cam. The adjustment means, preferably, comprise a screw secured to the shuttle by a clearance bushing mounted on one side of the slot and a threaded bushing mounted on the other side of the slot. Desirably, the screw has a screw head and the shuttle has a recess on an outer edge of the shuttle for arresting downward movement of the screw head. It is also desirable that the slot has a narrow front portion immediately adjacent the central opening of the shuttle and a wider rear portion with the adjustment means positioned across the narrow portion of the slot.

It is to be understood that both the foregoing general description and the following detailed description are exemplary and explanatory but are not restrictive of the invention.

The accompanying drawings illustrate an example of a preferred embodiment of the invention, and, together with the description, serve to explain the principles of the invention.

Figure 2:
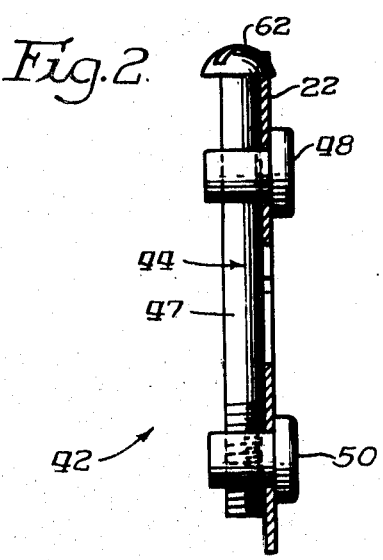

Of the drawings:

FIG. 1 is a perspective view of a shuttle having an adaptation means constructed in accordance with the teachings of this invention; and FIG. 2 is a side elevation partially in section of the shuttle and adaptation means of FIG. 1.

For the purposes of clarity and simplification, only those parts of an intermittent film feeding mechanism for a motion picture projector which are essential to an understanding of this invention have been illustrated in the drawings.

As shown in FIG. 1 the intermittent pulldown mechanism, generally 20, includes a shuttle 22 which extends laterally of the motion picture film path. It will be understood, of course, that a film is threaded through the usual gate structure (not shown) positioned immediately in front of the intermittent mechanism, the gate structure being omitted from the drawing for clearness. Shuttle 22 has an intermediately located central opening 30 and at least one cam engaging surface, and as shown in FIG. 1, shuttle 22 has two diametrically opposed U-shaped nylon cam shoes 31 and 32, with cam shoe 31 having a cam engaging surface 33 and cam shoe 32 having a cam engaging surface 35 which is diametrically opposed to cam engaging surface 33. Cam engaging surface 33 extends along one side of opening 30, while cam engaging surface 35 extends along an opposed side of opening 30.

Normally, the end of the shuttle closest to the film is provided with one, or as shown in FIG. 1, two film engaging members 24 which are attached to and turned at right angles to the body of the shuttle and can intermittently engage the usual perforations along the edge of the film to feed the film through the projector. Shuttle 22 is mounted to move up and down, and in and out relative to the film. Shuttle 22 will thus reciprocate up and down to effect film advance and will move in and out to move the film engaging members 24 into and out of engagement with the perforations in the film.

In accordance with this invention, a rotatable cam is provided which is engaged with the shuttle through the two cam engaging surfaces for reciprocating the shuttle and its attached film engaging member up and down relative to the film. As here embodied, the cam is a rotatable pulldown cam 26 which is engaged with shuttle 22 through opposed cam engaging surfaces 33 and 35. Cam 26 extends into opening 30 in shuttle 22 and is fixed to a drive means for rotating the cam, here illustrated as a drive shaft 28. The drive shaft is driven by a motor (not shown).

As shown in FIG. 1, pulldown cam 26 has a cam surface 27 on its outer periphery and is embraced by opposing U-shaped nylon cam shoes 31 and 32. Cam shoes 31 and 32 are fixed to shuttle 22 at diametrically opposed sides of opening 30 so that cam engaging surfaces 33 and 35 are in continuous contact with and engage cam surface 27 at diametrically opposed peripheral sides of cam 26. Cam engaging surfaces 33 and 35 are spaced from each other by a distance D.

When the motion picture projector is in operation, each revolution of drive shaft 28 will produce one revolution of cam 26. During each revolution of cam 26, the cam will, because of its eccentric nature, transmit a reciprocating motion to shuttle 22 through the continuous engagement of cam engaging surfaces 33 and 35 with cam surface 27. The profile of pulldown cam 26 is such that one complete revolution of pulldown cam 26 will produce one complete reciprocal stroke of shuttle 22 and of film engaging members 24, and hence the film engaging members will move at a frequency equal to the frequency of rotation of the drive shaft.

Shuttle 22 is piovtally mounted on a shaft 34 at the end opposite the film engaging members 24. Thus, film engaging members 24 will move through an arcuate path during each revolution of pulldown cam 26.

As will be understood by those skilled in the art, film engaging members 24 move into and out of engagement with the perforations in the film in selected timed relationship to its up and down movements. This movement is accomplished by conventional means, such as an in-and-out cam (not shown). The in-and-out cam and pulldown cam 26 are coordinated so that shuttle 22 is moved outwardly to retract engaging members 24 from the film perforations prior to the shuttle's movement to its up position and after the film engaging memgers have advanced the film downwardly along the film path. Likewise, shuttle 22 is moved inwardly to bring film engaging members 24 into engagement with successive film perforations prior to the shuttle's movement to its down position in a film feeding stroke. During in-and-out movement of shuttle 22, cam engaging surfaces 33 and 35 slide back and forth on cam surface 27.

In accordance with this invention, adaptation means mounted on the shuttle are provided for accurately adjusting the position of the cam engaging surfaces and comprise a slot, having opposed sides, formed with the shuttle and extending into the central opening, and an adjustment means positioned across the slot and secured to the shuttle adjacent the opposing sides of the slot for opening and closing the slot and thus changing the configuration of the shuttle and the position of the cam engaging surfaces relative to the cam. The adjustment means further permits accurate dimensioning of the cam engaging surfaces against the pulldown cam to prevent undue play therebetween and undue tightness. Clearly, each shuttle can be sized for use with a respective cam.

As here embodied, shuttle 22 has a slot, generally 36, having opposed spaced sides 38 and 40, formed within the shuttle and extending into central opening 30. In this embodiment, the adjustment means comprises a screw generally 44, having a threaded end 46, a screw head 62, and a smooth portion 47 extending between threaded end 46 and head 62. Screw 44 is positioned across slot 36 and is secured to shuttle 22 adjacent the opposing sides 38 and 40 of slot 36 by means of a clearance bushing 48 mounted on one side of the slot, and a threaded bushing 50 mounted on the other side of the slot. Clearance bushing 48 has a transverse internal bore that is slightly larger in diameter than the diameter of screw 44. Threaded bushing 50 has a transverse internal bore that is threaded to match the threads of screw 44.

Clearance bushing 48 is mounted on side 38 of slot 36, which side is closest to an outer edge 60 of shuttle 22, and threaded bushing 50 is mounted on side 40, which side is fartherest from outer edge 60.

Screw 44 is positioned with its smooth portion in bushing 48 and its end 46 threaded into bushing 50. Shuttle 22 has a recess 58 on outer edge 60 for arresting downward movement of screw head 62.

Slot 36 extends into central opening 30 intermediate opposed cam engaging surfaces 33 and 35. Slot 36 has a narrow front portion 52 immediately adjacent central opening 30, and a wider portion 54 positioned away from the central opening. Narrow portion 52 is connected to wider portion 54 by an intermediate stepped portion 56. Adjustment screw 44 is positioned across narrow portion 52 of slot 36. The provision of a wide portion and a narrow portion aids in obtaining the necessary leverage to adjust the opposing cam engaging surfaces.

In operation, the component parts of the shuttle mechanism are assembled using only normal inspection and without resorting to 100 percent inspection or selective assembly. The distance D between opposed cam engaging surfaces 33 and 35 is then measured and compared to a desired standard distance. The variations of the distance D produced by normal manufacturing of shuttles and cam shoes are such that selective assembly and 100 percent inspection of shoes has been necessary in the past to achieve proper operation of the shuttle. However, the present adaptation means accommodates these variances and the operating limits of adjustment screw 44 are capable of providing the proper adjustment for virtually every assembly. After comparing the distance D with a desired standard distance, the adjustment screw 44 is tightened or loosened to close or open slot 36 and hence opening 30 to the desired standard distance D. Slot 36 permits shuttle 22 to compress or expand when screw 44 is adjusted. Adjustment is accomplished by means of the force acting on shuttle 22 that is produced between recess 58 of outer edge 60 of shuttle 22 and threaded bushing 50. The manufacturing assembler is thus able to vary the dimension D slightly to permit the shoes to be tensioned to practically any degree of tightness desired. The adjustment means further permits accurate dimensioning of the cam engaging surfaces against the pulldown cam to prevent undue play therebetween and undue tightness. Clearly, each shuttle can be sized for use with a respective cam. After adjustment, screw 44 is sealed to bushing 50 or is otherwise fixed in position relative to bushing 50 to prevent further movement of the screw and thus to prevent opening 30 from changing its size during the life of the unit.

The invention in its broader aspects is not limited to the specific details shown and described and departures may be made from such details without departing from the principles of the invention and without sacrificing its chief advantages.

I claim:

1. An intermittent motion picture film moving mechanism for use in motion picture apparatus including a shuttle having an intermediately located central opening and two cam engaging surfaces, a film engaging member attached to the shuttle, a rotatable cam engaged with the shuttle through the two cam engaging surfaces for reciprocating the shuttle and its attached film engaging member up and down relative to the film, drive means for rotating the cam, and adaptation means mounted on the shuttle to accurately adjust the position of the cam engaging surfaces, said means comprising: a slot, having opposed sides, formed within the shuttle and extending into said central opening, and an adjustment means positioned across the slot and secured to the shuttle adjacent the opposing sides of the slot, for opening and closing the slot and thus changing the configuration of the shuttle and the position of the cam engaging surfaces with respect to the cam.

2. The intermittent film moving mechanism of claim 1 wherein the shuttle is pivoted at one end, the film engaging member is attached to the other end, and the cam is disposed within the intermediately located central opening of the shuttle to control movement of the shuttle arcuately of its pivot.

3. The intermittent film moving mechanism according to claim 1 wherein said two cam engaging surfaces are opposite each other and engage the cam at opposite peripheral sides of the cam.

4. The intermittent film moving mechanism of claim 1 wherein the adjustment means is a screw secured to the shuttle by a clearance bushing mounted on one side of the slot and a threaded bushing mounted on the other side of the slot.

5. The intermittent film moving mechanism of claim 4 wherein the screw has a screw head and the shuttle has a recess on an outer edge of the shuttle for arresting downward movement of the screw head.

6. The intermittent film moving mechanism of claim 4 wherein the slot has a narrow front portion immediately adjacent the central opening of the shuttle and a wider rear portion with the adjustment means positioned across the narrow portion of the slot.

7. An intermittent film moving mechanism including a shuttle having a central opening and two cam engaging surfaces, a film engaging member attached to the shuttle, a rotatable cam engaged with the shuttle through the two cam engaging surfaces for reciprocating the shuttle and its attached film engaging member up and down relative to the film, drive means for rotating the cam, and adaptation means to accurately adjust the position of the cam engaging surfaces with respect to the cam, said adaptation means comprising: a slot, having opposed sides, formed within the shuttle and extending into the central opening, said slot having a narrow front portion immediately adjacent the central opening of the shuttle and a wider rear portion, and adjustment means positioned across the slot and secured to the adjustable shuttle adjacent the opposing sides of the slot, said adjustment means comprising a screw for opening the slot and thus changing the configuration of the shuttle and the position of the cam engaging surfaces with respect to the cam.

References Cited
UNITED STATES PATENTS

| | | | |
|---|---|---|---|
| 2,475,622 | 7/1949 | Kuehn | 226—64X |
| 2,893,287 | 7/1959 | Lunzer | 352—196 |
| 3,504,571 | 4/1970 | Kim | 352—194X |

RICHARD A. SCHACHER, Primary Examiner

G. A. CHURCH, Assistant Examiner

U.S. Cl. X.R.

352—194